United States Patent
Christensen et al.

(10) Patent No.: US 7,745,549 B2
(45) Date of Patent: Jun. 29, 2010

(54) DISTORTIONAL MATRIX OF EPOXY RESIN AND DIAMINE

(75) Inventors: Stephen Christensen, Sammamish, WA (US); James S. Senger, Placentia, CA (US)

(73) Assignee: The Boeing Company, Chicago, IL (US)

( * ) Notice: Subject to any disclaimer, the term of this patent is extended or adjusted under 35 U.S.C. 154(b) by 438 days.

(21) Appl. No.: 11/613,667

(22) Filed: Dec. 20, 2006

(65) Prior Publication Data

US 2007/0149725 A1 Jun. 28, 2007

Related U.S. Application Data

(60) Provisional application No. 60/753,597, filed on Dec. 22, 2005.

(51) Int. Cl.
*C08G 59/50* (2006.01)
*C08L 63/02* (2006.01)
*C08L 63/04* (2006.01)

(52) U.S. Cl. .................. 525/481; 525/523; 528/124

(58) Field of Classification Search ............... None
See application file for complete search history.

(56) References Cited

U.S. PATENT DOCUMENTS 4,663,401 A * 5/1987 Saito et al. ............... 525/505
4,972,031 A * 11/1990 Choate et al. ............. 525/535

FOREIGN PATENT DOCUMENTS

| EP | 0486044 | 5/1992 |
| EP | 0496786 | 8/1992 |
| JP | 2-127420 A * | 5/1990 |
| WO | WO97/24398 | 7/1997 |

OTHER PUBLICATIONS

HCAPLUS accession No. 1981:516396, Pilipenko et al., Zhurnal Prikladnoi Khmii, 1981, one page.*
HCAPLUS accession No. 1981:516396 for the Pilipenko et al. article in Zhurnal Prikadnoi Khimmii, vol. 54, No. 6, 1981, along with CAS registry Nos. 25068-38-6 for a polymer of diglycidyl ether of bisphenol A and 599-61-1 for 3,3'-diaminodiphenylsulfone, four pages.*
Clarence Chui et al; "Monte Carlo Modeling of Amorphous Polymer Deformation: Evolution of Stress with Strain'" *Macromolecules* 1999, 32, pp. 3795-3808; © 1999 American Chemical Society.
Dennis L. Malandro et al; "Relationships of shear-induced changes in the potential energy landscape to the mechanical properties of ductile glasses"; *Journal of Chemical Physics*, vol. 110, No. 9, pp. 4593-4601; Mar. 1, 1999.

* cited by examiner

*Primary Examiner*—Robert Sellers
(74) *Attorney, Agent, or Firm*—Klintworth & Rozenblat IP LLC

(57) ABSTRACT

The invention relates to composites having increased distortional deformation, and/or decreased dilatation load, as expressed within the von Mises strain relationship, which provide increased von Mises strain results. These composites may provide enhanced composite mechanical performances.

18 Claims, 2 Drawing Sheets

| Composition | Von Mises Strain |
|---|---|
| phenyl-isopropyl-phenyl | 0.237 |
| phenyl-isopropyl-phenyl-isopropyl-phenyl | 0.386 |
| phenyl-methylene-phenyl | 0.178 |
| phenyl-sulfone-phenyl | 0.223 |
| -phenyl- | 0.068 |
| phenyl-sulfide-phenyl | 0.159 |
| phenyl-methyl substit. methyline-phenyl | 0.283 |
| phenyl-isopropyl-phenyl-ether-2hydroxy propyl-ether-phenyl-isopropyl-phenyl | 0.182 |
| DEN 431 - phenyl-methylene-phenyl-methylene-phenyl w/ glycidyl on central phenyl | 0.237 |

FIG. 3

DISTORTIONAL MATRIX OF EPOXY RESIN AND DIAMINE

CROSS-REFERENCE TO RELATED APPLICATIONS

This utility application claims priority to provisional U.S. Application Ser. No. 60/753,597, filed on Dec. 22, 2005, and titled New Distortional Composite Matrix.

BACKGROUND OF THE INVENTION

A wide variety of composite structures exist. Many of these composite structures display low distortion load, high dilatation load, and low von Mises strain results. Composites having low von Mises strain results may limit the performance of the composite, such as by having low strength, high weight, and/or experiencing other types of problems.

A composite, and/or process for forming such a composite, is needed which may solve or reduce one or more problems associated with one or more of the prior art composites and/or methods.

SUMMARY OF THE INVENTION

In one aspect of the invention, a composition comprises a DEN431 substance and a 33DDS substance. The DEN431 substance comprises a Bisphenol F based tri-functional novolac epoxy resin, and the 33DDS substance comprises a 3,3' diaminodiphenylsulfone.

In another aspect of the invention, a composition comprises a DEN431 substance with a metaBAPS substance. The DEN431 substance comprises a Bisphenol F based tri-functional novolac epoxy resin, and the metaBAPS substance comprises a 4,4' bis (3-aminophenoxy)diphenylsulfone.

In a further aspect of the invention, a composition comprises a Tactix123 substance and a 33DDS substance. The Tactix123 substance comprises a diglycidyl ether of Bisphenol-A, and the 33DDS substance comprises a 3,3' diaminodiphenylsulfone.

In another aspect of the invention, a composition comprises a DEN431 substance with an APB133 substance. The DEN431 substance comprises a Bisphenol F based tri-functional novolac epoxy resin, and the APB133 substance comprises a 1,3 bis(3-aminophenoxy)benzene.

In yet another aspect of the invention, a composition comprises a substance made of diglycidyl α,α'-bis(4-hydroxyphenyl)-p-diisopropylbenzene (Bis M) with a metaBAPS substance. The metaBAPS substance comprises a 4,4' bis (3-aminophenoxy)diphenylsulfone.

In a further aspect of the invention, a composition comprises a substance made of 1,3 bis(4-aminophenoxy)-2,2 dimethylpropane with a Tactix123 substance. The Tactix123 substance comprises a diglycidyl ether of Bisphenol-A.

In an additional aspect of the invention, a composition comprises a substance made of 1,3 bis(3-aminophenoxy)-2,2 dimethylpropane with a Tactix123 substance. The Tactix123 substance comprises a diglycidyl ether of Bisphenol-A.

In another aspect of the invention, a composition is provided which was designed to have higher distortional loads and lower dilatation loads in order to increase von Mises strain.

In still another aspect of the invention, a method is provided for forming a composition having increased von Mises strain. The method comprises combining an amine and an epoxy in order to increase distortional load and lower dilatation load.

These and other features, aspects and advantages of the invention will become better understood with reference to the following drawings, description and claims.

BRIEF DESCRIPTION OF THE DRAWINGS

FIG. 3 depicts a table which shows von Mises strain for a series of di-glycidyl epoxies which demonstrates one of the theories of the invention.

DETAILED DESCRIPTION OF THE INVENTION

The following detailed description is of the best currently contemplated modes of carrying out the invention. The description is not to be taken in a limiting sense, but is made merely for the purpose of illustrating the general principles of the invention, since the scope of the invention is best defined by the appended claims.

It has been discovered that a composite polymeric matrix with improved (i.e. increased) distortional deformation, and/or decreased (i.e. lower) dilatation load, as expressed with the von Mises strain relationship, will increase von Mises strain and provide enhanced composite mechanical performance. The instant invention provides novel compositions, and methods for their formulation, which provide increased distortional deformation, and/or decreased dilatation load, in order to increase von Mises strain within the composition.

Figure 1:
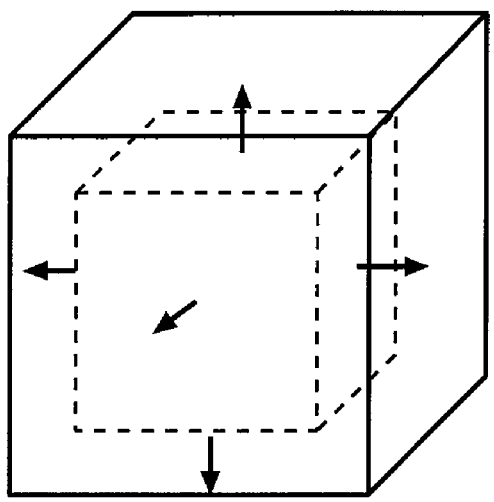
FIG. 1 depicts a perspective view of a cube showing the volume expansion of the cube upon the application of force.

The deformation of matter can be divided into two categories: dilatation or volume expansion and distortion. The mechanisms correspond to the elastic and plastic processes occurring in matter under a uniform state of stress. Forces applied to a physical system that result in a volume change are termed elastic and have been adequately described using Hooke's Law. Volume expansion as shown in FIG. 1, is a result of a local loss of intermolecular cohesion and a reduction of density. As long as the displacements are small, the linear restoring force or cohesive strength will reverse the effects on release of the applied force. The cohesive forces in question are also responsible for the thermal contraction with temperature and a direct consequence of the decrease in amplitude of the molecular vibrations as the polymer is cooled. The cohesive forces can be described using a potential function which relates the intermolecular energy of attraction and the separation distance to van der Waals forces and nearest neighbor repulsions.

At a macroscopic level, an isotropic body deforming elastically will expand conforming to the following relations: $\epsilon_v = J_1 + J_2 + J_3$, where $J_1 = \epsilon_1 + \epsilon_2 + \epsilon_3$, $J_2 = \epsilon_1 \epsilon_2 + \epsilon_2 \epsilon_3 + \epsilon_3 \epsilon_1$, $J_3 = \epsilon_1 \epsilon_2 \epsilon_3$, and $\epsilon_1, \epsilon_2$, and $\epsilon_3$ are the principal strains. The volume change can be approximated by the first invariant of strain $J_1$, which represents over 98% of the volume change.

The critical volume expansion capacity is numerically equal to the amount of contraction experienced by the polymer on cooling from it's glass temperature. The thermal contraction that is directly relatable to the reduction in thermal energy and the decrease in the equilibrium intermolecular distance represents the maximum elastic expansion potential under mechanical or thermal loading.

Figure 2:
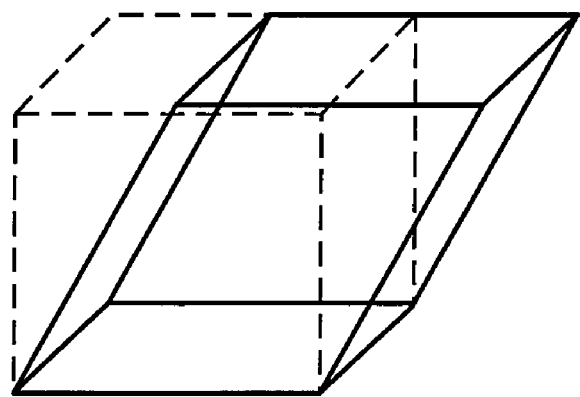
FIG. 2 depicts a perspective view of the cube of FIG. 1 upon the application of a biased strain to the cube.

It is reasonable to view distortion or a deviatoric response of a material to an applied force as an abrupt shear transformation or cooperative motion of a specific volume or segment of the polymer chain responding to a strain bias. The distorted cube illustrated in FIG. 2 is a simple depiction of a distortional process.

The von Mises strain can be determined using the following equation, with the input quantities being the three principal strains:

$$\varepsilon_{vM} = \left\{ \frac{1}{2} [(\varepsilon_1 - \varepsilon_2)^2 + (\varepsilon_2 - \varepsilon_3)^2 + (\varepsilon_1 - \varepsilon_3)^2] \right\}^{\frac{1}{2}}$$

Polymers within composites can and are often subjected to a force application that severely limits their ability to flow. The constraint imposed by fiber orientations greater than approximately 30° to the principal strain direction will generate a dilatational critical deformation. The lamina orientations with angle differentials less than approximately 25° to the direction of global strain will transition from a dilatational to a distortional critical behavior.

Our enhanced understanding of the constituent materials deformation behavior has enabled us to design structure that can take advantage of the unique performance characteristics of composite materials. Analysis and test validation has shown that mechanical loading that favors matrix distortion rather than dilatation allows for a composite structure specific performance capability. Particular constituent materials ultimate strengths however can limit the achievement of maximum performance. For example, our testing shows that fiber performance is limited by a low matrix critical distortional capability of the thermoset resins used today. Our study of strength critical structure has compared the present design and construction approach with a matrix distortional dominated design approach. We studied a commercial transport category wing and fuselage. The weight savings potential offered by a composite with increased von Mises strain capability may be approximately 15 percent for the fuselage structure and 30% for the wing structure.

Using a combination of computer simulation and experimental chemical formulation, a number of epoxy-amine formulations (such as formulations comprising at least one diamine and at least one epoxy resin as disclosed herein) have been identified that exhibit an increase in von Mises strain with respect to many existing commercially available materials. The formulation methodology attempted to improve von Mises strain by selecting chemical structures that contained certain key molecular features and maximized the amount used within the constraints of a production handleable product form. The specific amine structures selected have organic portions that contribute substantially to the overall system distortion. They have been selected for their alternating stiff phenyl rings and rotating $sp^3$ bond hybridization centers such as ether, methylene, isopropyl or sulfone groups that allow the amine moiety to interrogate numerous torsional configurations when subjected to externally applied loads. The conformations considered are specific spatial arrangements of atoms or groups of the molecule inasmuch as the arrangements are determined by a specification of the torsion angles. The epoxy components previously available do not have similar configurations and have historically been selected because they are liquids and as such impart tack for ease of handling to the final formulation.

The measurement of von Mises strain requires fabrication and testing of a composite lamina. The fiber orientation of the test coupon may be set to 10 degrees with respect to the load application direction. The strain at failure as defined by catastrophic fracture may be recorded and analyzed using a commercial Finite Element Analysis code for determination of the maximum value of the principle strains within the body of the specimen at the instant of failure. The principle strains may then be used as input values to the von Mises equation for determination of the critical von Mises strain.

From our testing and computer simulations, the specific compositions which have exhibited improvements in von Mises strain include the following compositions: (1) a DEN431 substance with a 33DDS substance; (2) a DEN 431 substance with a metaBAPS substance; (3) a Tactix123 substance with a 33DDS substance; (4) a DEN431 substance with an APB133 substance; (5) a diglycidyl α,α'-bis(4-hydroxyphenyl)-p-diisopropylbenzene (Bis M) substance with a metaBAPS substance; (6) a 1,3 bis(4-aminophenoxy)-2,2 dimethylpropane substance with a Tactix123 substance; and (7) a 1,3 bis(3-aminophenoxy)-2,2 dimethylpropane substance with a Tactix123 substance.

The DEN431 substance comprises a Bisphenol F based tri-functional novolac epoxy resin. The metaBAPS substance comprises a 4,4' bis (3-aminophenoxy)diphenylsulfone substance. The Tactix123 substance comprises a diglycidyl ether of Bisphenol-A substance. The 33DDS substance comprises a 3,3' diaminodiphenylsulfone substance. The APB133 substance comprises a 1,3 bis(3-aminophenoxy)benzene substance. It should be noted that the following substances are epoxies: DEN431; Tactix123; and diglycidyl α,α'-bis(4-hydroxyphenyl)-p-diisopropylbenzene (Bis M). Similarly, it should be noted that the following substances are amines: 33DDS; metaBAPS; APB133; 1, 3 bis(4-aminophenoxy)-2, 2 dimethylpropane; and 1, 3 bis(3-aminophenoxy)-2, 2 dimethylpropane.

The molecular basis for a polymer matrix ability to undergo a deviatoric response to an applied force is theorized as due to a cooperative motion of a specific volume or segment of the polymer chain. The molecular motions or dynamics of the polymer structure includes vibrational, bond bending and conformational rearrangement that can be considered as independent processes. The scale of the segmental dynamics may be determined by the local molecular environment, and the number and energy barriers to conformational rearrangements. The local environment may be limited to the scale established by the crosslinks formed during polymerization.

Simulations of these processes indicates that macroscopic loading is manifested at the molecular level as a continual disappearance of a local energy minimum due to the conformational rearrangement followed by relaxation to a new minimum. The potential energy hypersurface that represents the condition describes the glassy material as a distribution of energy minima in phase space, with maxima and saddle points that define the system dynamics. Because strain or deformation is an intensive quantity—it is proportional to the fraction of the system involved in the relaxation to a new energy minimum. Therefore more molecular structures which are able to undergo conformational exploration will enhance the polymer's ability to undergo an increased macroscopic distortional response. In addition, based on the intensive nature of deformation, using a volumetric argument for quantifying individual ingredient improvement potential has also been found to be valid.

Both experimental data and computer simulations have indicated that the polymer formulation should aim to maximize possible backbone rotational conformations with a structure optimized for exploration of dihedral conformations to maximize energy dissipation. Required features include alternating stiff phenyl rings and rotating $sp^3$ bond hybridization centers such as ether, methylene, isopropyl or sulfone groups that allow the molecule to interrogate numerous torsional configurations. Use of difunctional epoxies containing linked $sp^3$ centers such as Tactix177 on the other hand, have not performed as well as the alternating stiff and free rotation configurations. Meta rather than para substitution on the phenyl rings has been qualitatively seen as a means to increase the possible number of potential conformers.

FIG. 3 provides a table which shows von Mises strain for a series of di-glycidyl epoxies. DEN431 is provided in the table for reference. The results demonstrate that by adding substances to the chain, increased von Mises strain results may occur. For instance, phenyl has a von Mises strain of 0.068, while phenyl-isopropyl-phenyl has a von Mises strain of 0.237, and phenyl-isopropyl-phenyl-isopropyl-phenyl has a von Mises strain of 0.386. These results demonstrate the validity of the theory of the instant invention.

A typical prior art composition is SOTA System with IM-7 which testing has shown has a von Mises strain of approximately 0.19, which is a fairly typically von Mises strain result for the prior art compositions. State of the art epoxy resin formulations for composites are usually commercial trade secrets but a typical generic formulation would consist of an epoxy such as MY721 or tetraglycidyl 4,4'-diamino diphenylemthane and 44DDS or 4,4'-diaminodiphenylsulfone mixed in a ratio of about 20 to 40% by weight of amine to epoxy. A typical von Mises strain value for a formulation such as this is in the range of 0.15 to 0.19. All seven of the new compositions disclosed under this invention have substantially improved von Mises strain results, as set forth below, which are completely unexpected over the prior art.

For instance, experimental results have shown that the composition of DEN431 mixed with 33DDS has a von Mises strain of 0.295 with an amine weight percent content of 28% to 0.345 with an amine weight content of 52%. The 28% formulation represents a 1:1 stoichiometry ratio.

Experimental results have shown that the composition of DEN431 mixed with mBAPS has a von Mises strain of 0.322 with an amine weight percent content of 41% to 0.342 with an amine weight content of 65%. The 41% formulation represents a 1:1 stoichiometry ratio.

Experimental results have shown that the composition of Tactix123 mixed with 33DDS has a von Mises strain of 0.294 with an amine weight percent content of 27% to 0.345 with an amine weight content of 43%. The 27% formulation represents a 1:1 stoichiometry ratio.

Experimental results have shown that the composition of DEN431 mixed with APB133 has a von Mises strain of 0.313 with an amine weight percent content of 32% to 0.37 with an amine weight content of 56%. The 32% formulation represents the 1:1 stoichiometry ratio.

Experimental results have shown that the composition of diglycidcyl α,α'-bis(4-hydroxyphenyl)-p-diisopropylbenzene (Bis M) mixed with metaBAPS has a von Mises strain of 0.41 with an amine weight percent content of 24% to 0.42 with an amine weight percent content of 32%. The 32% weight content formulation is the 1:1 stoichiometry mixture.

Computer simulations have shown that the composition of 1,3 bis( 4-aminophenoxy)-2,2 dimethylpropane mixed with Tactix123 epoxy, with a 1:1 stoichiometric ratio of 30% by weight amine with 70% by weight epoxy, has a von Mises strain of 0.31.

Computer simulations have shown that the composition of 1,3 bis(3-aminophenoxy)-2,2 dimethylpropane mixed with Tactix123 epoxy, with a 1:1 stoichiometric ratio of 30% by weight amine with 70% by weight epoxy, has a von Mises strain of 0.32.

In another embodiment of the invention, a composition is provided which was designed to have higher distortional loads and lower dilatation loads in order to increase von Mises strain. In one embodiment, the composition may have a von Mises strain of at least 0.300. In another embodiment, the composition may have a von Mises strain of at least 0.400. In still another embodiment, the composition may be made of an amine and an epoxy (such as a composition comprising at least one diamine and at least one epoxy resin as disclosed herein). In other embodiments, the composition may comprise varying von Mises strain results, and may be made of differing materials.

In still another embodiment of the invention, a method of forming a composition having increased von Mises strain is provided. The method may comprise combining an amine and an epoxy (such as combining at least one diamine and at least one epoxy resin as disclosed herein) in order to increase distortional load and/or lower dilatation load. In another embodiment, the method may further comprise the step of combining variations of amines and epoxies (such as combining variations of diamines and/or variations of epoxy resins as disclosed herein) in order to form the composition with increased distortional load, with lowered dilatation load, and with increased von Mises strain. In still another embodiment, the von Mises strain of the formed composition may be at least 0.300. In yet another embodiment, the von Mises strain of the formed composition may be at least 0.400. In other embodiments, varying steps may be utilized to provide increased von Mises strain, and the resultant von Mises strain may be in differing amounts.

The invention may provide composites having increased distortional deformation, and/or decreased dilatation load, which may provide unexpected increases in von Mises strain results and unexpected enhanced composite mechanical performances over one or more of the prior art composites. These advantages in mechanical performances may provide composites which are of increased strength, lower weight, and/or having other advantages in one or more properties over one or more of the prior art composites.

It should be understood, of course, that the foregoing relates to exemplary embodiments of the invention and that modifications may be made without departing from the spirit and scope of the invention as set forth in the following claims.

We claim:

1. A method of forming a composition having a von Mises strain of at least 0.300 by combining a mixture comprising at least one diamine and at least one epoxy resin which collectively have the von Mises strain of at least 0.300, the mixture comprising one of the following: (1) a Bisphenol F based tri-functional novolac epoxy resin and a 4,4' bis (3-aminophenoxy) diphenylsulfone; (2) a Bisphenol F based tri-functional novolac epoxy resin and a 3,3 'diaminodiphenylsulfone; (3) a Bisphenol F based tri-functional novolac epoxy resin and a 1,3 bis(3-aminophenoxy) benzene; (4) a diglycidyl α, α'-bis (4-hydroxyphenyl)-p-diisopropylbenzene and a 4,4' bis (3-aminophenoxy) diphenylsulfone; (5) a 1,3 bis(4-aminophenoxy)-2,2 dimethylpropane and a diglycidyl ether of Bisphenol-A; and (6) a 1,3 bis(3-aminophenoxy)-2,2 dimethylpropane and a diglycidyl ether of Bisphenol-A.

2. The method of claim 1 wherein the von Mises strain of said formed composition is at least 0.400.

3. The method of claim 1 wherein the combining the mixture consisting of the at least one diamine and the at least one epoxy resin comprises combining the Bisphenol F based tri-functional novolac epoxy resin and the 3,3'diaminodiphenylsulfone.

4. The method of claim 3 wherein the von Mises strain of said formed composition ranges up to substantially 0.345 with the diamine weight percent content being 52%, wherein said at least one diamine comprises said 3,3'diaminodiphenylsulfone.

5. The method of claim 1 wherein the combining the mixture consisting of the at least one diamine and the at least one epoxy resin comprises combining the Bisphenol F based trifunctional novolac epoxy resin and the 4,4'bis (3-aminophenoxy) diphenylsulfone.

6. The method of claim 5 wherein the von Mises strain of the formed composition ranges from substantially 0.322 with a diamine weight percent content of substantially 41% to substantially 0.342 with the diamine weight percent content of substantially 65%, wherein said diamine comprises said 4,4'bis (3-aminophenoxy) diphenylsulfone.

7. The method of claim 6 wherein the substantially 41% diamine weight percent content composition comprises a substantially 1:1 stoichiometry ratio.

8. The method of claim 1 wherein the combining the mixture consisting of the at least one diamine and the at least one epoxy resin comprises combining the Bisphenol F based trifunctional novolac epoxy resin and the 1,3 bis(3-aminophenoxy) benzene.

9. The method of claim 8 wherein the von Mises strain of the formed composition ranges from substantially 0.313 with the diamine weight percent content of substantially 32% to substantially 0.37 with the diamine weight percent content of substantially 56%, wherein said at least one diamine comprises said 1,3 bis(3-aminophenoxy) benzene.

10. The method of claim 9 wherein the substantially 32% diamine weight percent content composition comprises a substantially 1:1 stoichiometry ratio.

11. The method of claim 1 wherein the combining the mixture consisting of the at least one diamine and the at least one epoxy resin comprises combining the diglycidyl α, α'-bis (4-hydroxyphenyl)-p-diisopropylbenzene and the 4,4' bis (3-aminophenoxy) diphenylsulfone.

12. The method of claim 11 wherein the von Mises strain of the formed composition ranges from substantially 0.41 with a diamine weight percent content of substantially 24% to substantially 0.42 with the diamine weight percent content of substantially 32%, wherein said at least one diamine comprises said 4, 4'bis (3-aminophenoxy) diphenylsulfone.

13. The method of claim 12 wherein the substantially 32% diamine weight percent content composition comprises a substantially 1:1 stoichiometry ratio.

14. The method of claim 1 wherein the combining the mixture consisting of the at least one diamine and the at least one epoxy resin comprises combining the 1,3 bis(4-aminophenoxy)-2,2 dimethylpropane and the diglycidyl ether of Bisphenol-A.

15. The method of claim 14 wherein the combining the mixture consisting of the at least one diamine and the at least one epoxy resin comprises using a substantially 1:1 stoichiometric ratio of substantially 30% by weight of said 1,3 bis(4-aminophenoxy)-2,2 dimethylpropane substance with substantially 70% by weight of said diglycidyl ether of Bisphenol-A to yield the von Mises strain of substantially 0.31.

16. The method of claim 1 wherein the combining the mixture consisting of the at least one diamine and the at least one epoxy resin comprises combining the 1,3 bis(3-aminophenoxy)-2,2 dimethylpropane and the diglycidyl ether of Bisphenol-A.

17. The method of claim 16 wherein the combining the mixture consisting of the at least one diamine and the at least one epoxy resin comprises using a substantially 1:1 stoichiometric ratio of substantially 30% by weight of said 1,3 bis(3-aminophenoxy)-2,2 dimethylpropane substance with substantially 70% by weight of said diglycidyl ether of Bisphenol-A to yield the von Mises strain of substantially 0.32.

18. The method of claim 1 wherein the combining comprises combining the mixture consisting of one diamine and one epoxy resin from among the combinations of diamine and epoxy resin (1), (2), (3), (4), (5) or (6).

\* \* \* \* \*